United States Patent [19]

Minogue

[11] Patent Number: 4,760,876

[45] Date of Patent: Aug. 2, 1988

[54] REMOTE INSPECTION DEVICE TRANSPORT SYSTEM

[75] Inventor: Patrick M. Minogue, Shaler, Pa.

[73] Assignee: Westinghouse Electric Corp., Pittsburgh, Pa.

[21] Appl. No.: 902,807

[22] Filed: Sep. 2, 1986

[51] Int. Cl.$^4$ ............................................. G21C 17/00
[52] U.S. Cl. .................................. 165/11.2; 376/249; 376/248
[58] Field of Search ............... 376/260, 261, 245, 248, 376/249, 251; 165/11.2, 11.1; 294/19.1, 100, 906; 73/621-623; 15/104.3 SN

[56] References Cited

U.S. PATENT DOCUMENTS

| | | | |
|---|---|---|---|
| 3,370,599 | 2/1968 | Ciaccio | 15/104.3 SN |
| 3,959,840 | 6/1976 | Sato | 15/104.3 SN |
| 3,987,666 | 10/1976 | Blanc et al. | 376/249 |
| 4,231,419 | 11/1980 | Gugel | 165/11 A |
| 4,285,503 | 8/1981 | Calhoun et al. | 266/71 |
| 4,355,536 | 10/1982 | McShane et al. | 73/633 |
| 4,368,642 | 1/1983 | Carodiskey | 73/623 |
| 4,385,523 | 5/1983 | Gugel et al. | 376/249 |
| 4,389,611 | 6/1983 | Pigeon et al. | 324/220 |
| 4,515,747 | 5/1985 | Creek et al. | 376/249 |
| 4,520,673 | 6/1985 | Muller et al. | 73/623 |
| 4,581,938 | 4/1986 | Wentzell | 73/623 |

FOREIGN PATENT DOCUMENTS 2810487  9/1979  Fed. Rep. of Germany ...... 376/249

OTHER PUBLICATIONS

Copy of related pending U.S. patent application having U.S. Ser. No. 687,237, filed Dec. 28, 1984, by Stoner et al.

Copy of related pending U.S. patent application having U.S. Ser. No. 819,087, filed Jan. 15, 1986, by Klug et al.

*Primary Examiner*—Deborah L. Kyle
*Assistant Examiner*—Daniel Wasil

[57] ABSTRACT

The present invention is a transport system for an inspection system that includes a flexible controller end effector for carrying inspection and gripping devices. The transport system includes a hollow flexible conduit through which control cables for the effector can pass unobstructed. A rotatable deflector assembly helps guide the end effector as it enters the steam generator using a rotatable deflector channel and an extension. A drive assembly provides axial movement control for the end effector allowing easy insertion and retrieval. The axial movement is provided by friction rollers coupled to an axial drive mechanism and mounted in a drive box. The drive assembly also provides orientation control to allow the end effector to be rotated by rotating the drive box which rotates the conduit held in place by the direction rollers. The drive assembly further provides two spatially fixed locations from which the axial and rotational motions can be provided. The flexible conduit is taken up from and gathered by a conduit basket outside the steam generator. The conduit basket includes a control assembly for controlling the end effector via the control cables passing through the hollow conduit.

12 Claims, 11 Drawing Sheets

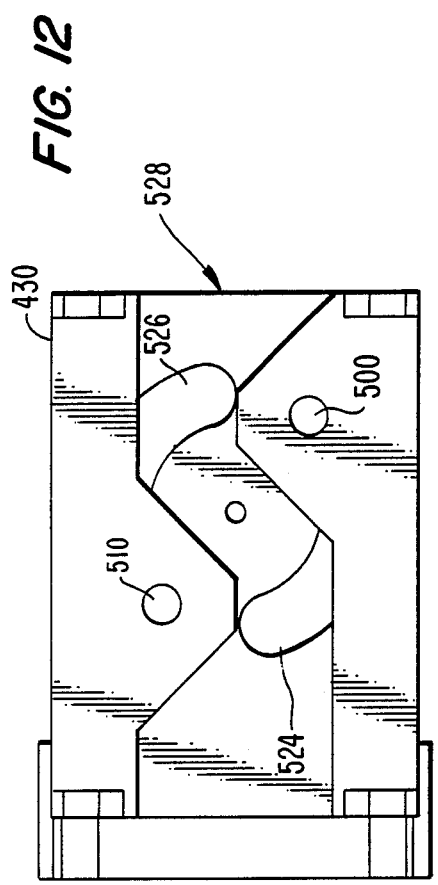
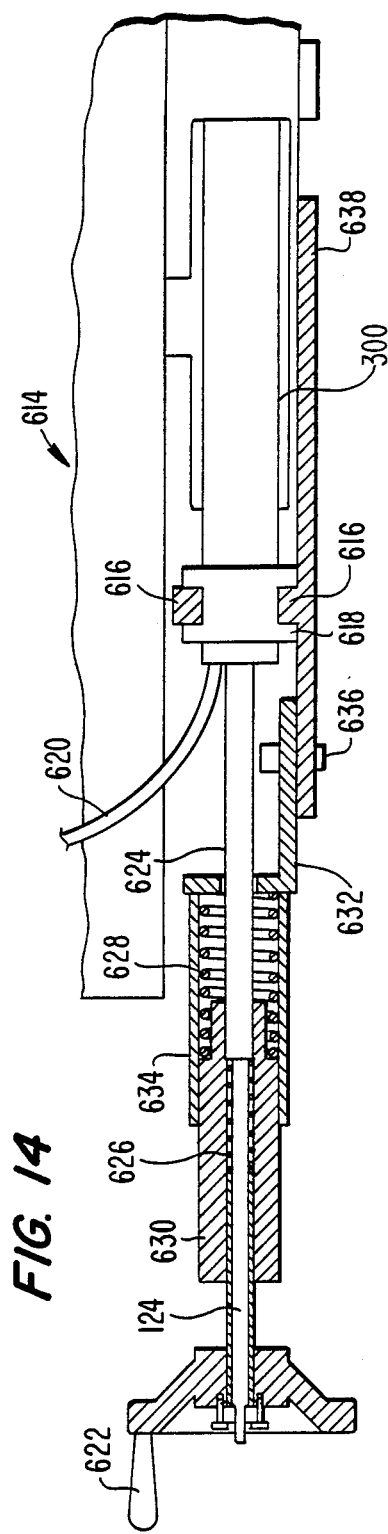

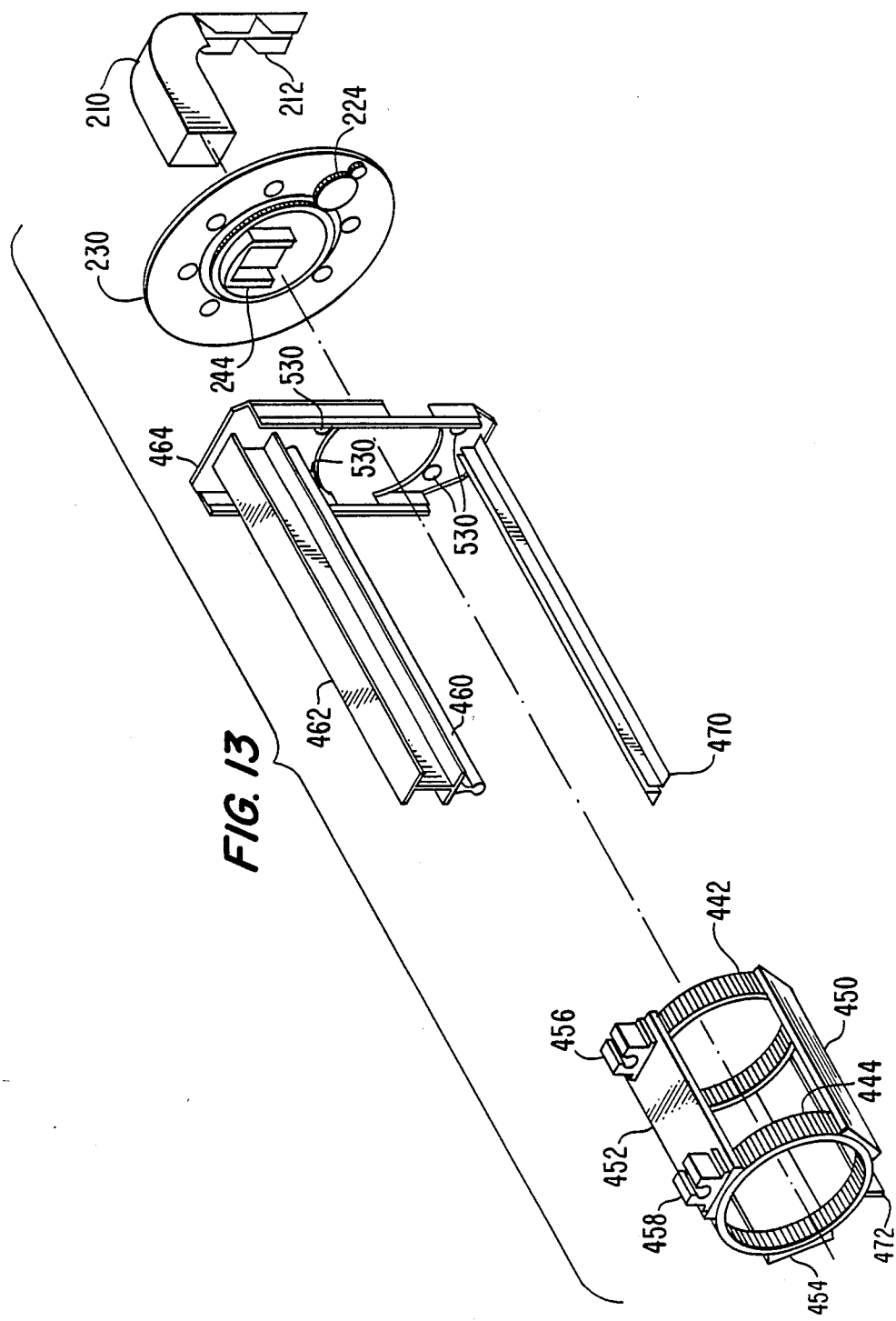

REMOTE INSPECTION DEVICE TRANSPORT SYSTEM

CROSS REFERENCES TO RELATED APPLICATIONS

This application is related to U.S. patent application Ser. No. 819,087, now U.S. Pat. No. 4,702,878, entitled SEARCH AND RETRIEVAL DEVICE and Ser. No. 687,237, now U.S. Pat. No. 4,703,817, entitled CONTROLLABLE VEHICLE FOR INSPECTING LIMITED ACCESS AREAS, both assigned to the assignee of the present application.

BACKGROUND OF THE INVENTION

1. Field of the Invention

The present invention is directed to a transport system for a remote inspection device and more particularly, to a transport system which will move an inspection device into a portion of a nuclear steam generator and allow the inspection device to be driven and manipulated once it is inside.

2. Description of the Related Art

An operating nuclear steam generator is constantly transferring heat from a heat source fluid to a drive fluid such as water converted into steam to drive a steam turbine.

The fluid from the heat source enters the steam generator, illustrated in FIG. 1, and passes through U-shaped tubes grouped in a tube bundle 12. The tube bundle 12 is surrounded by a tube wrapper 14 and then by a steam generator shell 16. A space exists between the tube wrapper 14 and the outer shell 16. Impurities in the drive fluid can be deposited as sludge at the bottom of the tube bundle 12 below the tube wrapper 14 during operation. In addition, objects lost during steam generator construction, such as welding rods, can become dislodged and fall through the annulus formed between the tube wrapper 14 and the outer shell 16 which is approximately 2 to 3 inches wide. It is necessary during periodic inspections to inspect the 4 to 6 inch cavity around the tube bundle 12 and below the tube wrapper 14 because the foreign objects create a threat to the integrity of the tube bundle 12 and, as a result, are removed, if possible. The only access into the space between the tube wrapper 14 and the outer shell 16 are handholes 18 approximately 5-6 inches in diameter and approximately 12-24 inches above a tube sheet through which the tubes pass. It is difficult to insert an inspection device, such as a miniature camera, etc., into the 2 to 3 inch space between the tube wrapper 14 and outer shell 16, and then guide the camera around the bottom periphery of the tube bundle for inspection purposes. The end of the inspection device can also include manipulation devices such as a gripper which will allow foreign objects in the cavity to be removed. The source fluid passing through the tube bundle 12 carries radioactive contaminants and human exposure to the small amount of the radiation passing through the handholes 18 must be kept at a minimum. Devices which require manipulation by a human through the handhole for inspecting the cavity around the bottom of the tube bundle thus have serious disadvantages.

SUMMARY OF THE INVENTION

It is an object of the present invention to provide a manipulation system for an inspection device which minimizes human exposure to radiation emitted at steam generator handholes.

It is another object of the present invention to allow easy control of insertion and orientation of an inspection device in a steam generator.

It is a further object of the present invention to allow easy control of the direction and the travel of the inspection device.

It is an additional object of the present invention to provide an inspection device drive system which will allow easy attachment of the inspection device to a drive conduit for driving the inspection device.

It is also an object of the present invention to provide conduit drive forces from spatially fixed locations.

The above objects can be attained by a transport system for an inspection system that includes an end effector for carrying inspection and gripping devices. The transport system includes a hollow flexible conduit through which control cables for the end effector pass. A deflector assembly helps guide the end effector and conduit as they enter the steam generator. A drive assembly provides axial movement control for the end effector through the conduit allowing easy insertion and retrieval. The drive assembly also provides orientation control to allow the end effector to be rotated by rotating the conduit. The flexible conduit is taken up from and gathered by a conduit basket outside the steam generator.

These together with other objects and advantages which will be subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 10-12 illustrate the components of a drive box 430 of the present invention;

FIG. 13 illustrates additional components of the present invention in an exploded view that continues the view of FIG. 7; and FIG. 14 illustrates the conduit tension assembly of the present invention.

DESCRIPTION OF THE PREFERRED EMBODIMENTS

Figure 1:
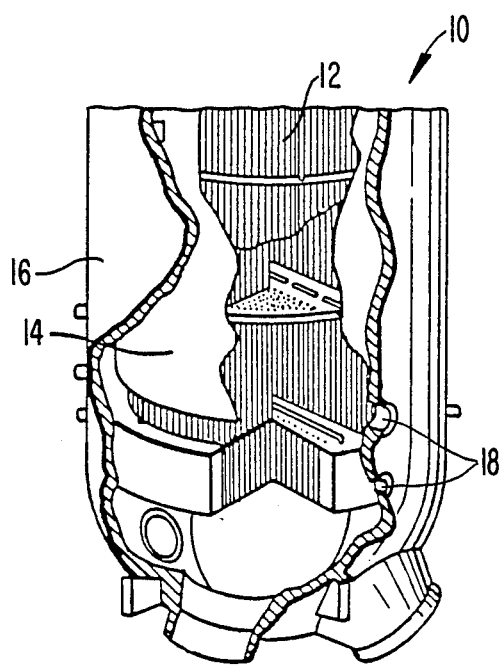
FIG. 1 illustrates a bottom portion of a steam generator to which the present invention is applied.
Figure 2:
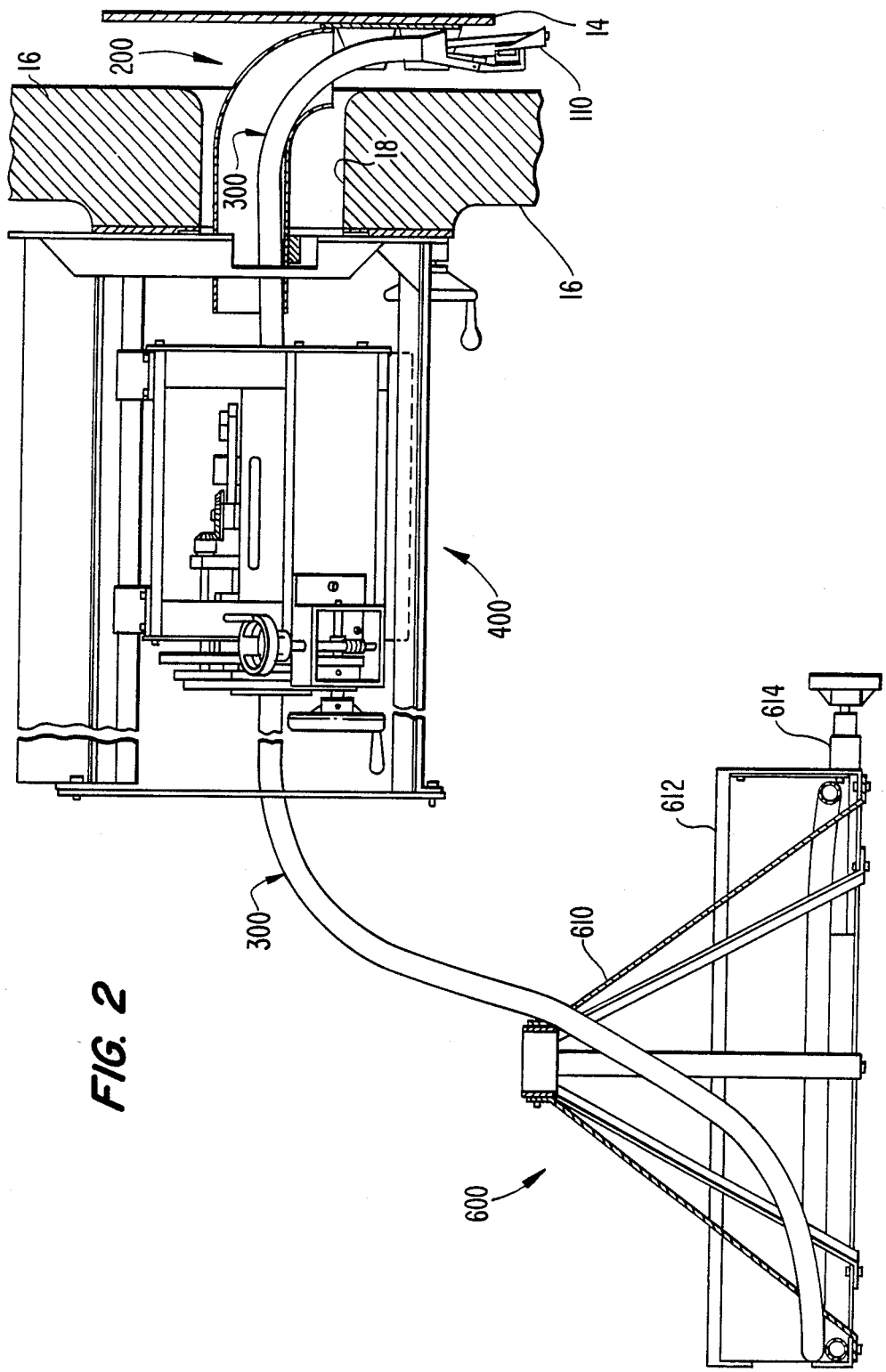
FIG. 2 depicts, in a side view, the major components of the transport system in accordance with the present invention.

A remote inspection device transport system, in accordance with the present invention, allows easy insertion of and control of an end effector 100 inserted into a steam generator between the tube wrapper 14 and the steam generator shell 16, as illustrated in FIG. 2. The end effector assembly 100 can have mounted thereon a fiberscope or a camera with which inspection personnel can inspect the cavity around the bottom of the tube bundle 12. The end effector assembly 100 can also carry devices such as grippers for retrieving objects deposited in the cavity. The end effector 100 is inserted into the space between the tube wrapper 14 and steam generator shell 16 by a deflector assembly 200 passing through the handhole 18 in the steam generator shell 16. The deflector assembly 200 forces the end effector 100 down toward the bottom of the steam generator shell 16 and can be used to guide the end effector 100 diagonally, so that the end effector 100 will travel around the circumference of the bottom of the tube bundle 12 for an inspection. The end effector 100 is attached to a hollow one inch drive conduit 300 of stainless steel with a 3 inch bending radius and available from Calco Manufacturing Co. The hollow drive conduit 300 allows control cables as well as inspection cables such as a fiber optic inspection cable to pass therethrough unobstructed. The drive conduit 300 is moved axially and rotationally by a drive assembly 400 which removably abuts the deflector assembly 200. The conduit 300 is taken out of and gathered by a conduit basket assembly 600 which automatically coils the conduit 300.

Figure 3:
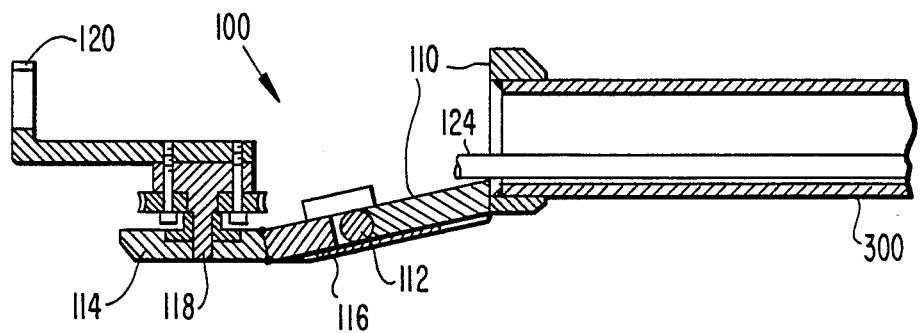
FIGS. 3 and 4 illustrate an end effector 100 transported by the present invention.

The flexible conduit 300 is attached to the end effector 100 by an end effector connector 110 as illustrated in FIG. 3. The end effector connector 110 is welded to the conduit. The connector 110 is attached, through hinge 112, to a pivot plate 114. Rotation of the pivot plate 114 in one direction past planar alignment with connector 110 is prevented by stop plate 116.

Figure 4:
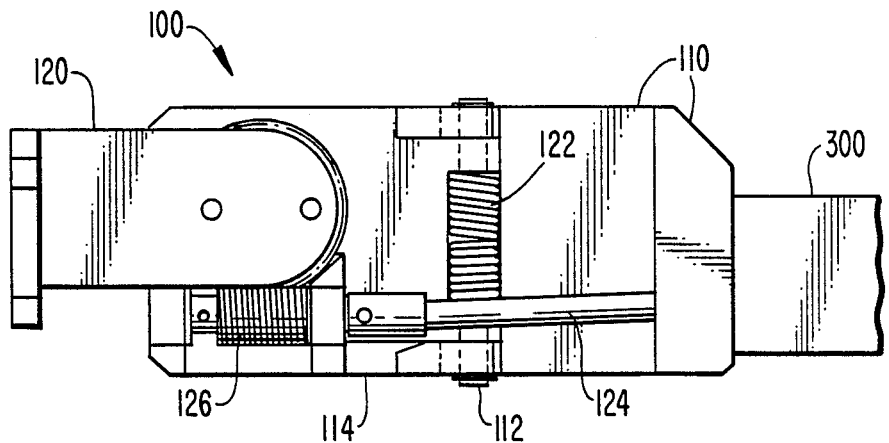

The pivot plate 114 holds a pivot 118 on which a device carriage 120 is attached. The device carriage 120 is the mounting unit for the inspection devices such as the camera or the end of the fiberscope cable. The pivot plate 114 is held coplanar with the connector 110 by a spring 122, as illustrated in FIG. 4. The hinge 112 and spring 122 allow the end effector to be bent around the curve in the deflector assembly 200 during insertion and yet return to the fully extended position after insertion. The orientation of the drive carriage 120 is controlled by a control cable 124 through a device control assembly 126. The device control assembly 126 includes a worm attached to control cable 124 engaging the worm gear, attached to the device carriage 120 to rotate the device carriage around pivot 118. Thus, the device carriage 120 can aim the inspection device such as the camera in several directions. The edges of the end effector 100 that could get caught on protruding objects in the steam generator and on the deflector assembly 200 are bevelled to provide angled sliding surfaces for surmounting such obstacles.

Figure 5:
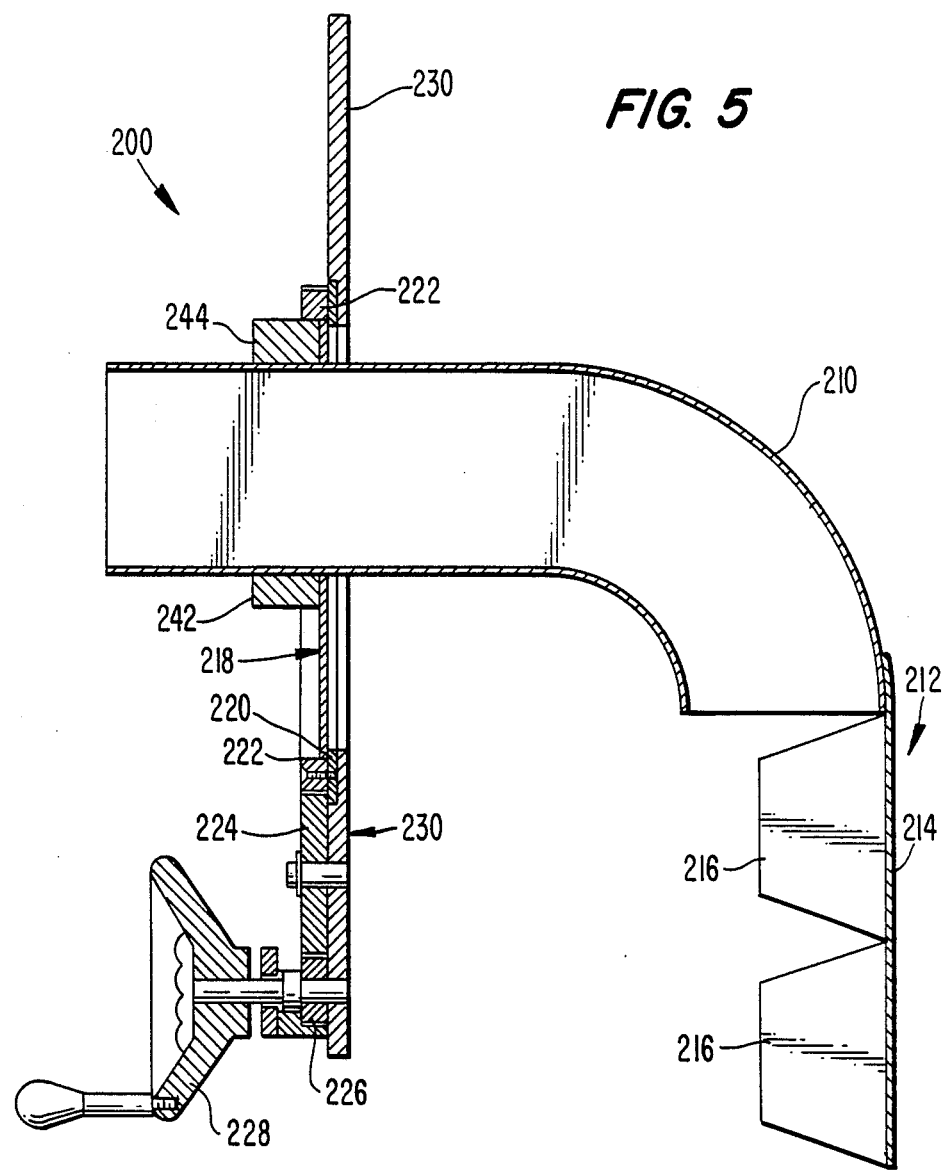
FIGS. 5 and 6 depict a deflector assembly 200 in accordance with the present invention.
Figure 6:
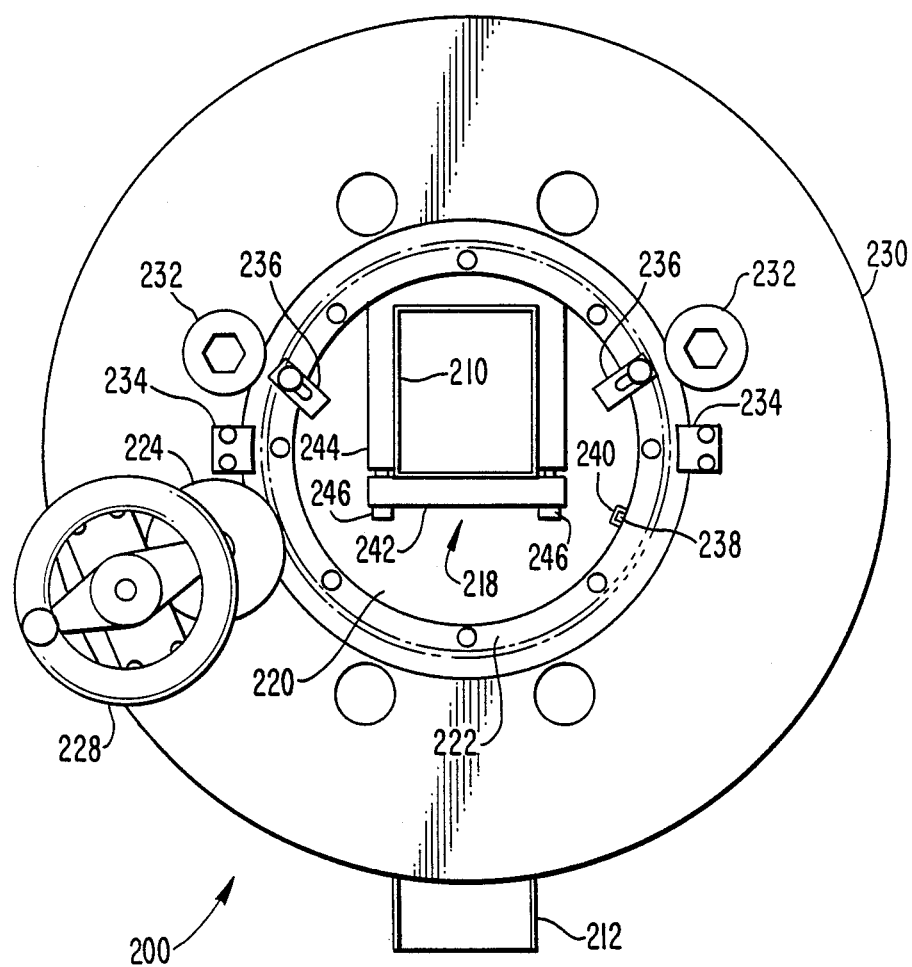

The end effector assembly 100 attached to the conduit 300 is inserted into the steam generator through the deflector assembly 200 depicted in FIGS. 5 and 6. The end effector 100 is inserted into a metal deflector channel 210, and is forced in a direction perpendicular to the insertion direction by the curve of the channel 210. An extension 212 of the channel 210 provides lateral support for the end effector 100 and conduit 300 when the deflector channel 210 is oriented to insert the end effector 100 diagonally. The extension 212 includes a flexible back surface 214 of, for example polyolefin flexible hinges and U-shaped channel cutouts 216 which allow the extension 212 to be bent while inserting same. The deflector channel 210 is offset from the handhole center and slidably mounted in a deflector mount 218. The deflector mount 218 is attached to a metal bearing plate or ring 220 which includes a ring gear 222 (FIG. 6). The ring gear 222 is rotated by spur gears 224 and 226 coupled to hand operated rotation wheel 228. The ring gear 222 is mounted in the bearing plate 220 which is attached to deflector mounting plate 230 and the ring gear 222 turns or slides in ring gear retainers 234. The ring gear 222 is bolted to the bearing plate 220 which rotates in a counterbore in plate 230. The bearing plate 220 is turned with ring gear 222 by a tab 238 plate 218 and a cutout 240 on the mounting plate 220. The releasable attachment of plate 218 to the ring gear 222 allows the bearing plate 220, channel 210 and extension 212 to be removed from the deflector assembly 200. That is, plate 218 removably abuts plate 220 using clamps 236 and plate 220 is held in place by retainers 234. The ability to remove the deflector channel 210 allows the deflector to be inserted into the cavity between the tube wrapper 14 and steam generator shell 16. A clamp plate 242 is attached to a clamp 244 by threaded bolts. The clamp 244 is welded to plate 218 and the clamping structure allows the deflector 210 to be slid into and out of the handhole 18 and to be fixed in position when desired. The rotation of handle 228 transmits a rotational force through the spur gears 226 and 224 to ring gear 222. Since the ring gear is attached via the mounting plate 220 and mount 218 to the deflector 210, the deflector is rotated whenever handle 228 is turned. Thus the deflector channel 210 can be rotated to guide the end effector 100 and conduit 300 in a preferred diagonal direction.

Figure 7:
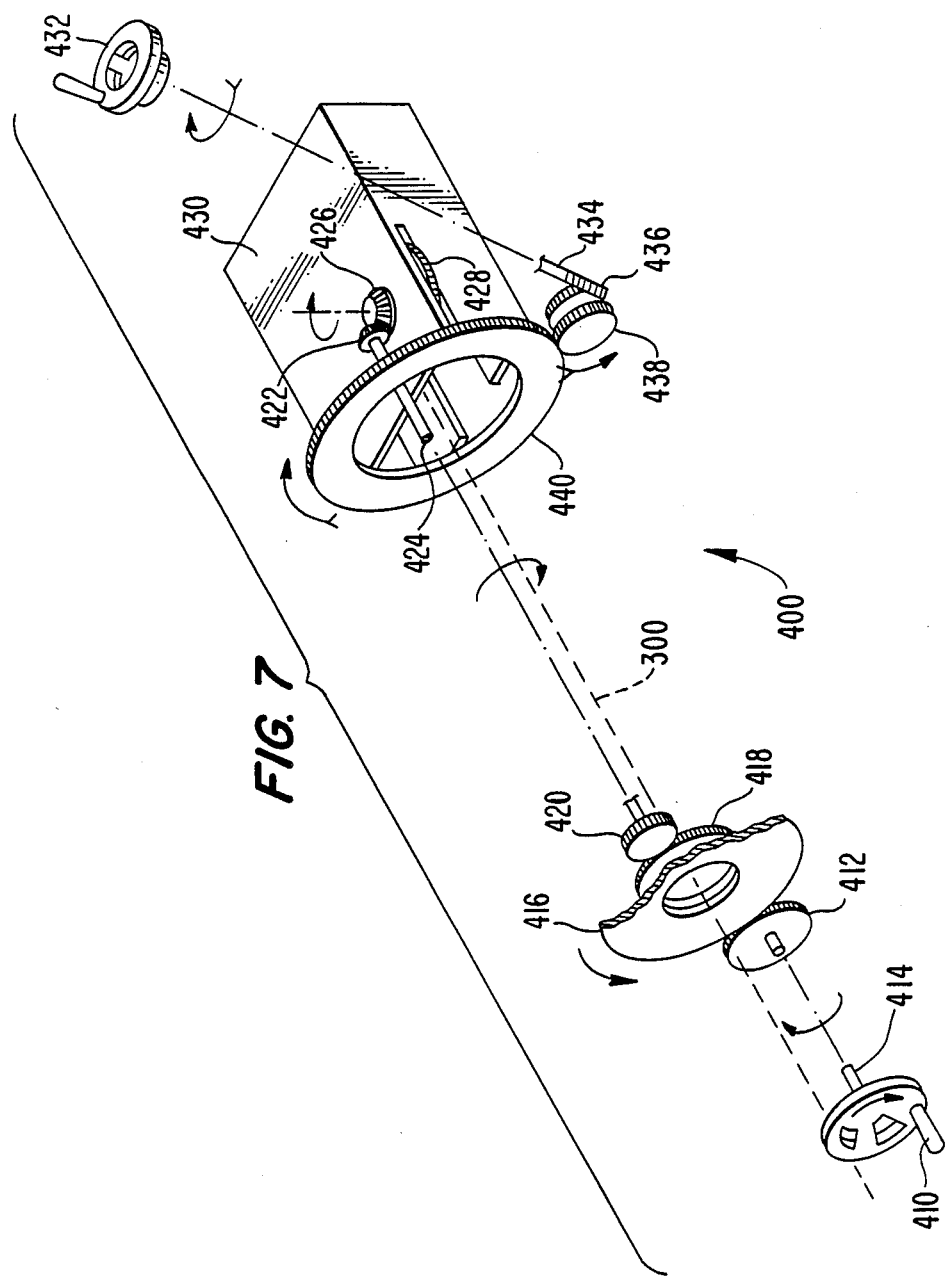
FIG. 7 is an exploded view illustrating the gear motions in a drive assembly 400 of the present invention which provide axial and rotational motion to end effector 100 through conduit 300.

FIG. 7 illustrates the components of drive assembly 400 which provide the axial movement and rotation of the conduit 300. The arrow without a tail depicts motion which causes axial movement of the conduit 300 and the arrow with a tail indicates movement which provides rotation of the conduit 300. During axial movement, the conduit axial drive handle 410 transmits motion to spur gear 412 through shaft 414. The spur gear 412 rotates outer ring gear 416 attached to inner ring gear 418. The inner ring gear 418 drives spur gear 420 which transfers motion to pinion gear 422 through shaft 424. The pinion gear 422 rotates bevelled gear 426 attached to a friction conduit drive roller (not shown). The bevelled gear is also attached to roller spur gear 428 which transfers movement to a second drive roller (not shown) through another identical roller spur gear (not shown). The drive rollers frictionally move the conduit through ring gears 416 and 418 and through drive box 430. Rotation of the axial drive, handle 410 in one direction causes movement of the end effector and conduit 300 into the steam generator and rotation in the opposite direction pulls the conduit 300 and end effector assembly 100 out of the steam generator. Ring gears 416 and 418 serve as idler gears which permit handle 410, which remains fixed in space, to transmit power to shaft 424. For any rotational position of shaft 424, the handles 410 and 432 remain fixed in space permitting drive motors to replace handles 410 and 432 while preventing drive motor control cables from becoming entangled with conduit 300.

During rotational movement of the conduit 300, rotation drive handle 432 transfers rotation through shaft 434 to worm gear 436. The worm 436 interfaces with worm gear 437 which is coupled to spur gear 438 by a shaft 439 and transfers motion to ring gear 440. The ring gear 440 is fixed to the drive box 430 by screws. The use of a worm 436 in engagement with worm gear 437 prevents rotation drive handle 432 from being counterrotated whenever axial drive handle 410 is rotated. That is, the use of worm 436 allows the rotational position of the effector 100 and conduit 300 to be maintained while driven axially. The drive box 430 also includes a slot, shown in greater detail in FIG. 12, which allows the conduit to be easily threaded through the drive and friction rollers.

Figure 8:
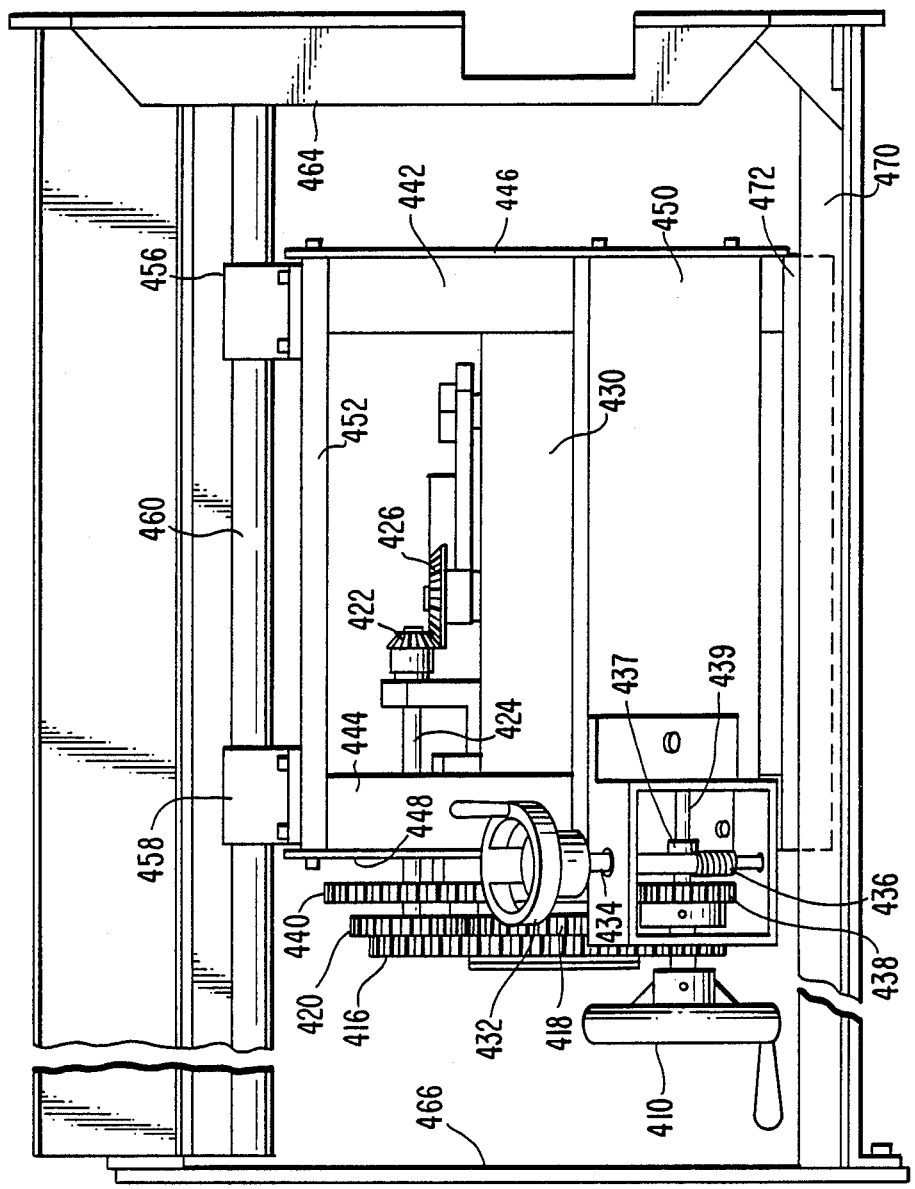
FIG. 8 is a side view of the drive assembly 400 in accordance with the present invention.

FIG. 8 provides a more detailed side view of the drive assembly 400 first depicted in FIG. 2. The drive box 430 includes race roller wheels (not shown) which allow the drive box to rotate in drive box races 442 and 444. The drive box is prevented from axially moving in the races 442 and 444 by end plates 446 and 448. The races 442 and 444 are held separate and in alignment with the race roller wheels on the drive box 430 by separator plates 450-454. The top separator plate is attached to rail slides 456 and 458 which allow the assembly to slide on slide rail 460. The slide rail 460 is carried by beam 462 attached to slide rail 460. The beam 462 is attached to a rack assembly which includes a steam generator end plate 464 which couples to the steam generator. The beam 462 is also attached to end plate 466. The rack assembly also includes a guide channel 470 below the drive assembly. The guide channel 470 engages guide 472 attached to the end plates 446 and 448 and prevents rotation of the races 442 and 444, separator plates 450, 452 and 454 and slide rail 460 while allowing the drive assembly to slide axially on slide rail 460. The ability to move the drive assembly away from the steam generator will allow the end effector 100 to be removed from the steam generator without completely removing the drive assembly. A sufficient slide space must be provided so that the end effector 100 can be completely removed from the steam generator. In addition, the slide space should be sufficient to manipulate the deflector channel 210 through the handhole 18. The drive assembly also includes appropriate mounting plates and boxes for affixing the axial and rotational gear assemblies to the separator plates 450 and 452.

Figure 9:
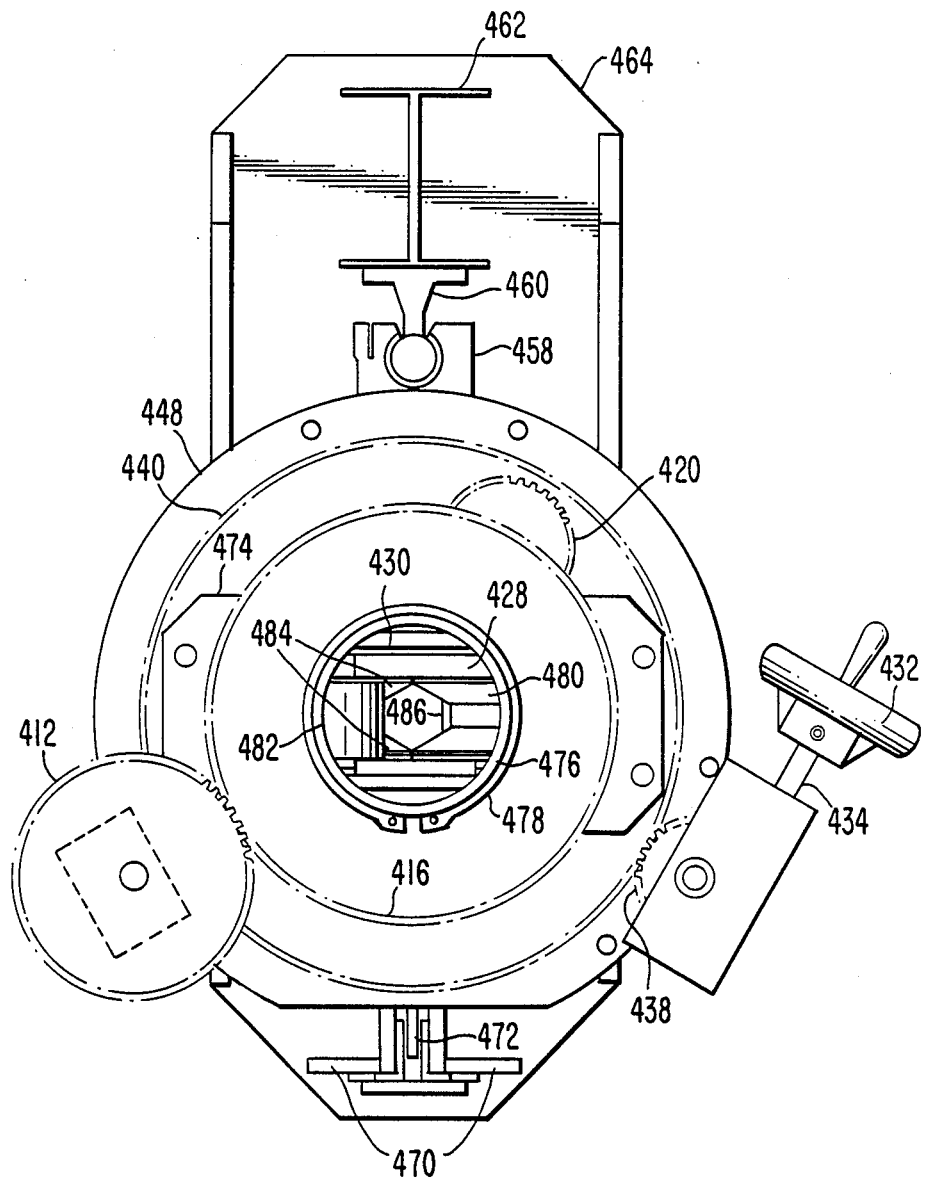
FIG. 9 is an end view of the drive assembly 400 of the present invention.

FIG. 9 provides an end view of the drive assembly illustrating attachment of ring gear 440 to the plate 474. The outer ring gear 416 and inner ring gear 418 are held on a hollow shaft 476 by a retainer 478. The hollow shaft is integral with plate 474 and plate 474 is bolted to ring gear 440. The conduit 300 passes through the shaft 476 and between a first drive roller 480 and a friction roller 482, and between a second drive roller 484 and a second friction roller 486. Each pair of a drive and friction roller are designed to contact the conduit 300 at three equally spaced circumferential points to prevent unbalanced compressional forces from being applied to the conduit 300. The two pairs then provide six different conduit symmetrical contact points. The drive and friction rollers are polyurethane.

Figure 10:
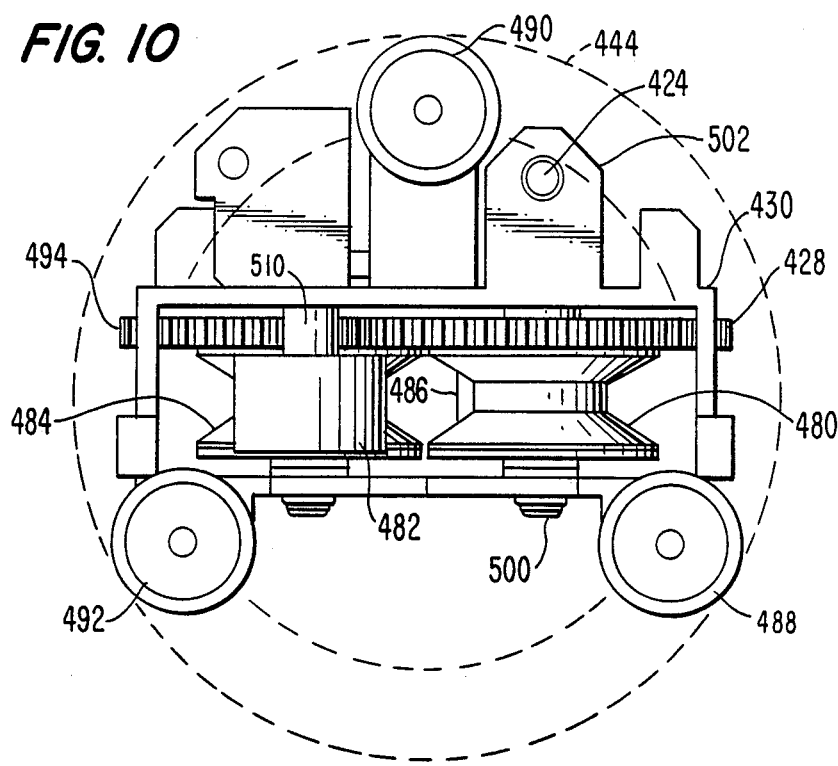

FIG. 10 is an end view of the drive box assembly showing the race rollers 488-492, also made of plastic, which roll in race 444. This figure also illustrates the relationship between the second drive roller 484 and the spur gear 494 affixed to the second drive roller 484 and driven by roller spur gear 428. This view also illustrates how the flexible conduit 300 passes between a first drive roller 480 and a first friction roller 482 and between a second drive roller 484 and a second friction roller 486. The friction roller assembly includes a shaft 510 about which the friction roller 482 rotates. The roller 480 rotates on shaft 500. Also illustrated is the shaft support 502 through which the axial drive shaft 424 passes.

Figure 11:
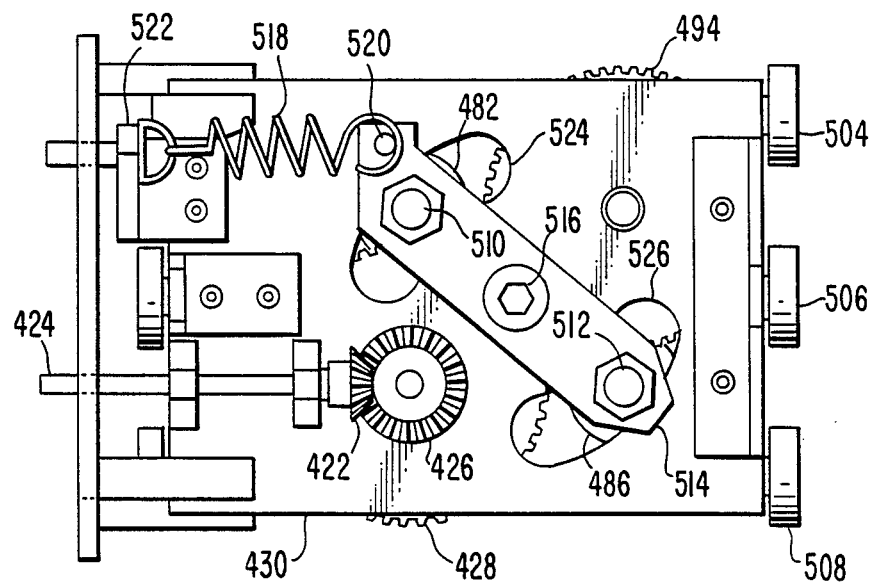

FIG. 11 illustrates a top view of the drive box assembly showing the rear race rollers 504-508 attached to the rear of drive box 430. The friction rollers 482 and 486 are mounted on friction roller shafts 510 and 512 which couple the friction rollers 482 and 486 to a friction roller rocker arm 514. The friction roller shafts 510 and 512 engage the rocker arm via threads which allow proper alignment with the conduit. The rocker arm 514 pivots around pivot shaft 516 affixed to box 430, so that the flexible conduit 300 is constantly pressed into engagement with drive rollers 480 and 484. The tension is maintained by a tension spring 518 coupled between a rocker arm pin 520 attached to the rocker arm 514 and a spring retaining plate 522 that includes a spring loop. The friction roller shafts 510 and 512 pivot in pivot slots 524 and 526 that provide space for sufficient pivoting movement to allow complete disengagement of the conduit from the drive rollers, so that the conduit can be removed and/or inserted in the drive box assembly through a cable insertion slot 528 illustrated in FIG. 12 which is a bottom view of the drive box 430.

FIG. 13 illustrates an exploded view of the relationship between the frame and drive box carrying components of the present invention and should be viewed together with FIG. 7. In particular, FIG. 13 illustrates the relationship between rack assembly mounting holes 530 and corresponding holes in deflector mounting plate 230 through which bolts are used to attach the drive box assembly to the cover plate holes of the handhole 18. This figure also illustrates the third separator plate 454 and its relationship to the other separator plates 450 and 452. The drive box 430 rotates in the races 442 and 444 while the races 442 and 444 slide on slide 460.

Returning to FIG. 2, the conduit basket assembly 600 includes a coiling winding frame 610 which forces the conduit 300 into a spiral coil inside the basket frame 612. A conduit tension assembly 614, which maintains tension on the cables within the conduit 300, is illustrated in more detail in FIG. 14. The tension assembly 614 includes a conduit mount 616 which engages friction fit mounting couple 618 attached to conduit 300. Extending from the conduit 300 is a smaller conduit 624 from which end effector control cable 124 emerges and a fiberscope cable 620 through which the operator can view the interior of the steam generator. The end effector control cable 124 is attached to an end effector control handle or hand wheel 622 and transmits rotational force directly to the control cable 124. A spring 626 maintains tension on the control cable 124. The smaller conduit 624 is kept under tension by a spring 628 that applies a separation drive force between handle support 630 and slide 632. The slide 632 is adjustable by adjusting slide holding nut and bolt combination 636. The entire tension assembly is attached to a basket mounting plate 638 coupled to the basket 612.

Throughout the above-described invention, aluminum should be used as a part material for low overall weight.

The many features and advantages of the present invention are apparent from the detailed specification and thus it is intended by the appended claims to cover all such features and advantages of the invention which fall within the true spirit and scope thereof. Further, since numerous modifications and changes will occur to those skilled in the art, it is not desired to limit the invention to the exact construction and operation illustrated and described, and accordingly all suitable modifications and equivalents may be resorted to, falling within the scope of the invention. For example, rather than use manually controllable handles for controlling the motions within the drive system, electronically controllable positioning motors can be used so that the operator viewing the interior of the steam generator can control position. The end plate 464 by which the drive assembly 400 is attached to the handhole 18 could be hinged to allow the drive assembly 400 to swing away from the handhole 18 rather than slide away. The system of the present invention is also suitable for inspecting the tube lane created in the center of the U-shaped tube bundle 12.

I claim:

1. A drive system for a slidable inspection device used for inspecting an inspection area, said drive system comprising:
   a flexible conduit attached to the inspection device drivable in an axial direction mechanically transmitting axial motion to the inspection device, rotatable about the axial direction mechanically transmitting rotational motion to the inspection device and removable from said drive system while said drive system is in an assembled state;
   removable guide means for movably and mechanically guiding the inspection device and the flexible conduit into the inspection area;
   conduit motion control means for moving the flexible conduct and inspection device into and out of the inspection area and independently controlling rotational orientation of the inspection device by rotating the flexible conduit; and
   integral conduit collection and inspection device pivot control means for collecting the flexible conduit and controlling pivoting of the inspection device.

2. A drive system for an inspection device used for inspecting an inspection area, said drive system comprising:
   a flexible conduit attached to the inspection device drivable in an axial direction mechanically transmitting axial motion to the inspection device and rotatable about the axial direction mechanically transmitting rotational motion to the inspection device;
   guide means for guiding the inspection device and the flexible conduit into the inspection area, said guide means comprising:
      a removable deflector through which the flexible conduit and inspection device travel;
      a bendable deflector extension coupled to said removable deflector, and providing support to the flexible conduit and inspection device when the removable deflector is oriented non-vertically; and
      a deflector rotation assembly coupled to said removable deflector and rotating the removable deflector and bendable deflector extension;
   conduit motion control means for moving the flexible conduit and inspection device into and out of the inspection area and controlling rotational orientation of the inspection device by rotating the flexible conduit; and
   integral conduit collection and inspection device pivot control means for collecting the flexible conduit and controlling pivoting of the inspection device.

3. A system as recited in claim 2,
   wherein said guide means further comprises:
      a deflector clamp preventing sliding movement of the removable deflector; and
      a removable deflector mounting plate fixed to said deflector clamp, and
   wherein said deflector rotation assembly comprises:
      a rotatable ring gear engaging said removable deflector mounting plate; and
      a gear drive unit engaging said rotatable ring gear.

4. A system as recited in claim 1, wherein said guide means is spatially fixed with respect to the inspection area during an inspection and said conduit motion control means comprises drive means, spatially fixed with respect to said guide means axially and rotationally, for providing independently controllable rotational orientation and axial motions to said flexible conduit.

5. A drive system for an inspection device used for inspecting an inspection area, said drive system comprising:
   a flexible conduit attached to the inspection device drivable in an axial direction mechanically transmitting axial motion to the inspection device and rotatable about the axial direction mechanically transmitting rotational motion to the inspection device;
   guide means for guiding the inspection device and the flexible conduit into the inspection area;
   conduit motion control means for moving the flexible conduit and inspection device into and out of the inspection area and controlling rotational orientation of the inspection device by rotating the flexible conduit, said conduit motion control means comprising:
      a rotatable drive box gripping the flexible conduit and providing independently controlled rotational and axial motion to the flexible conduit;
      a race in which the rotatable drive box rotates; and
      a slide bar on which said race slides; and
   integral conduit collection and inspection device pivot control means for collecting the flexible conduit and controlling pivoting of the inspection device.

6. A system as recited in claim 5,
   wherein said conduit motion control means further comprises:
      a beam carrying said slide bar; and
      a guide channel coupled to said beam, and
   wherein said race includes a guide sliding in said guide channel.

7. A system as recited in claim 6, wherein said rotatable drive box comprises:
   an axial gear drive train;
   a slotted drive box;
   a drive roller coupled to the axial gear drive train and fixed in said slotted drive box;
   a friction roller forcing the flexible conduit into engagement with said drive roller and fixed in said slotted drive box; and
   a rotatational gear drive train rotating the slotted drive box and including means for preventing rotation of the slotted drive box when said axial gear drive train is in motion.

8. A system as recited in claim 7, wherein said axial gear drive train comprises:
   a bevel gear coupled to said drive roller and fixed to said slotted drive box;
   a pinion gear engaging said bevel gear;

a shaft held by said slotted drive box and coupled to said pinion gear;
a ring spur gear coupled to said shaft;
a ring gear engaging said ring spur gear and through which said flexible conduit passes;
a drive spur gear engaging said ring gear; and
a drive shaft coupled to said drive spur gear and in a fixed spatial position.

9. A system as recited in claim 7, wherein said rotatational gear train comprises:
a ring gear attached to said slotted drive box and through which said flexible conduit passes;
a spur gear engaging said ring gear;
a worm gear coupled to said spur gear;
a worm engaging to said worm gear; and
a drive shaft coupled to said worm and in a fixed spatial position.

10. A system as recited in claim 7, wherein said rotatable drive box further comprises:
a tension bar coupled to said friction roller;
a spring coupled to said tension bar and providing a flexible conduit engagement force through said tension bar to said friction roller.

11. A drive system for an inspection device used for inspecting an inspection area, said drive system comprising:
a flexible conduit attached to the inspection device drivable in an axial direction mechanically transmitting axial motion to the inspection device and rotatable about the axial direction mechanically transmitting rotational motion to the inspection device;
guide means for guiding the inspection device and the flexible conduit into the inspection area;
conduit motion control means for moving the flexible conduit and inspection device into and out of the inspection area and controlling rotational orientation of the inspection device by rotating the flexible conduit; and
integral conduit collection and inspection device pivot control means for collecting the flexible conduit and controlling pivoting of the inspection device, pivotal orientation of said inspection device is controlled by a rotatable cable, and said integral conduit collection and inspection device pivot control means comprising:
a collection basket fixed in a stationary position when said conduit is rotated; and
tensioning and control means for holding the flexible conduit and providing rotational control of the rotatable cable.

12. A drive system for an inspection device, having an inspection cable, for inspecting a steam generator having a handhole through a steam generator shell and having a tube wrapper spatially confronting the handhole, said drive system comprising:
an end effector adapted for holding the inspection device and controlled by a drive cable;
a flexible conduit connected to the end effector through which the drive cable and inspection cable pass;
a rotatable L-shaped deflector, coupled to the handhole, forcing the end effector and flexible conduit between the steam generator shell and the tube wrapper;
a slidable drive assembly, coupled to the handhole, including a rotatable drive box having drive rollers axially driving said flexible conduit and gripping said flexible conduit while the rotatable drive box is rotated, thereby rotating said flexible conduit and drive box in a fixed spatial relationship to the slidable drive assembly;
a conduit basket collecting said flexible conduit as it leaves the slidable drive assembly; and
a drive cable tensioning and control device attached to said conduit basket, said flexible conduit and said drive cable.

* * * * *